United States Patent
Niu et al.

(10) Patent No.: US 10,959,270 B2
(45) Date of Patent: Mar. 23, 2021

(54) NPRACH CONFIGURATION AND FORMAT FOR UNLICENSED NBIOT SYSTEM

(71) Applicant: Apple Inc., Cupertino, CA (US)

(72) Inventors: Huaning Niu, Milpitas, CA (US); Wenting Chang, Beijing (CN); Qiaoyang Ye, Fremont, CA (US); Salvatore Talarico, Sunnyvale, CA (US); Rongrong Sun, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/446,177

(22) Filed: Jun. 19, 2019

(65) Prior Publication Data
US 2019/0394806 A1 Dec. 26, 2019

Related U.S. Application Data

(63) Continuation of application No. 62/688,288, filed on Jun. 21, 2018.

(51) Int. Cl.
| | |
|---|---|
| H04L 12/28 | (2006.01) |
| H04W 74/08 | (2009.01) |
| H04L 5/14 | (2006.01) |
| H04L 29/08 | (2006.01) |
| H04W 72/04 | (2009.01) |
| H04W 4/70 | (2018.01) |
| H04J 1/16 | (2006.01) |
| H04W 88/02 | (2009.01) |

(52) U.S. Cl.
CPC .......... *H04W 74/0833* (2013.01); *H04L 5/14* (2013.01); *H04L 67/12* (2013.01); *H04W 4/70* (2018.02); *H04W 72/0446* (2013.01); *H04W 88/02* (2013.01)

(58) Field of Classification Search
CPC .............. H04W 74/0833; H04W 4/70; H04W 72/0446
USPC ................. 370/252, 329, 430, 442
See application file for complete search history.

(56) References Cited

U.S. PATENT DOCUMENTS

| 2018/0248675 A1* | 8/2018 | Bhattad | H04L 5/22 |
| 2019/0254013 A1* | 8/2019 | Chang | H04L 67/12 |

(Continued)

OTHER PUBLICATIONS

3GPP TS 36.331 version 14.6.2 Release 14 https://www.etsi.org/deliver/etsi_ts/136300_136399/136331/14.06.02_60/ts_136331v140602p.pdf (Year: 2018).*

(Continued)

*Primary Examiner* — John Pezzlo
(74) *Attorney, Agent, or Firm* — Kowert, Hood, Munyon, Rankin & Goetzel, P.C.

(57) ABSTRACT

Systems and methods of providing a NPRACH preamble in a multefire system are described. A UE configured for multefire NB-IoT or eMTC operation receives, from an eNB, access information that includes a SIB on a narrowband channel of an unlicensed band. Based on the access information, the UE transmits a NPRACH preamble in two or six contiguous uplink subframes. The NPRACH preamble is transmitted in two or six contiguous subframes. When two subframes are used, four symbol groups each having a 266.7 μs CP and two symbols are transmitted without a gap therebetween. When six subframes are used, four symbol groups each having a 266.7 μs CP and five symbols are transmitted without a gap therebetween.

20 Claims, 6 Drawing Sheets

(56) References Cited

U.S. PATENT DOCUMENTS

2020/0178258 A1* 6/2020 Park .................. H04W 72/0413
2020/0236524 A1* 7/2020 Ye ......................... H04L 5/0044

OTHER PUBLICATIONS

3GPP TS 36.211 version 14.6.0 Release 14 https://www.etsi.org/deliver/etsi_ts/136200_136299/136211/14.06.00_60/ts_136211v140600p.pdf (Year: 2018).*

* cited by examiner

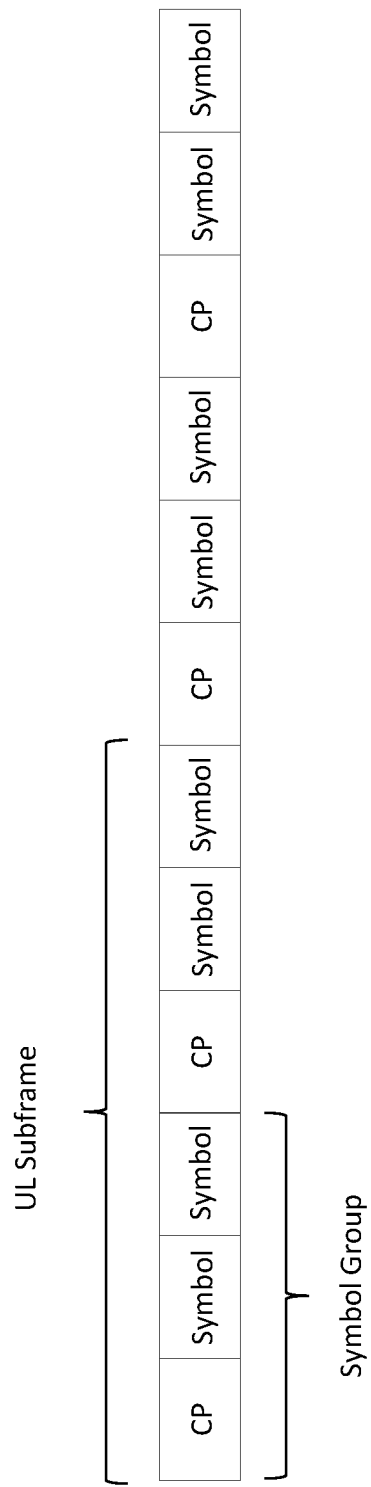

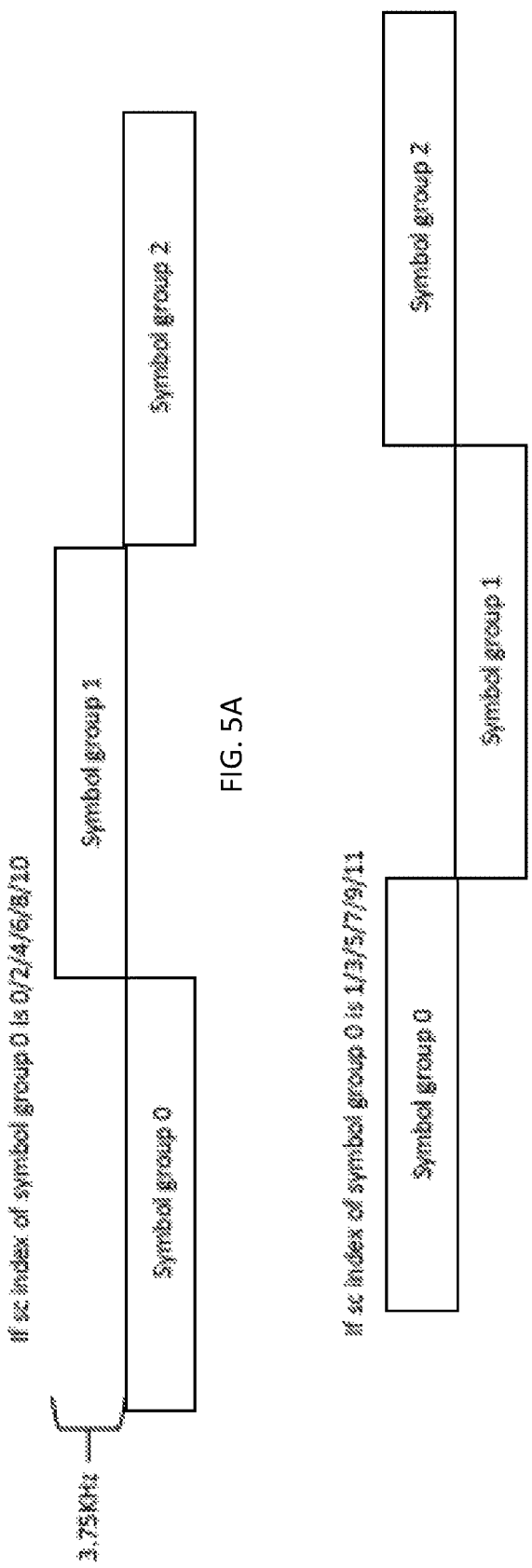

NPRACH CONFIGURATION AND FORMAT FOR UNLICENSED NBIOT SYSTEM

This application claims the benefit of priority under 35 U.S.C. 119(e) to U.S. Provisional Patent Application Ser. No. 62/688,288, filed Jun. 21, 2018, which is incorporated herein by reference in its entirety.

TECHNICAL FIELD

Embodiments pertain to radio access networks (RANs). Some embodiments relate to cellular networks, including Third Generation Partnership Project (3GPP) $5^{th}$ generation (5G) New Radio (NR) (or next generation (NG)) networks. Some embodiments relate to unlicensed band narrowband internet of things (NB-IoT) systems.

BACKGROUND

The use of various types of systems has increased due to both an increase in the types of devices user equipment (UEs) using network resources as well as the amount of data and bandwidth being used by various applications, such as video streaming, operating on these UEs. In particular, the introduction of a massive amount of IoT devices, in which a large number of computing devices are interconnected to each other and to the Internet to provide functionality and data acquisition at relatively low levels, has resulted in a veritable explosion in network use. To increase the ability of the network to contend with this network use, use of the unlicensed band by cellular devices and systems continues to be explored.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 4A illustrates an example of a Physical Random Access Channel (NPRACH) preamble in accordance with some embodiments; FIG. 4B illustrates another example an NPRACH preamble in accordance with some embodiments.

FIG. 5A illustrates an example of back-to-back transmission of three symbol groups with a first index in accordance with some embodiments; FIG. 5B illustrates an example of back-to-back transmission of three symbol groups with a second index in accordance with some embodiments.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
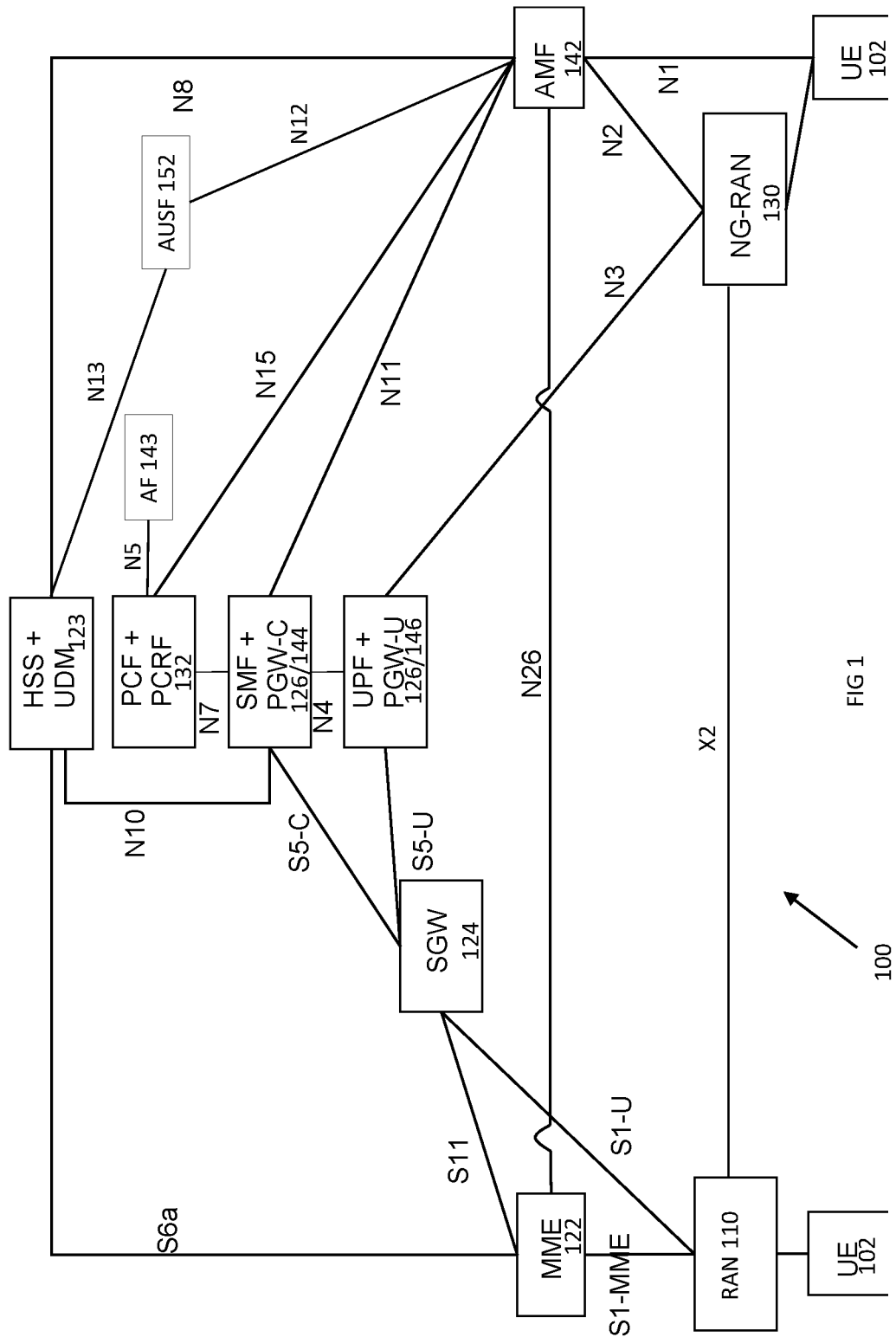
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
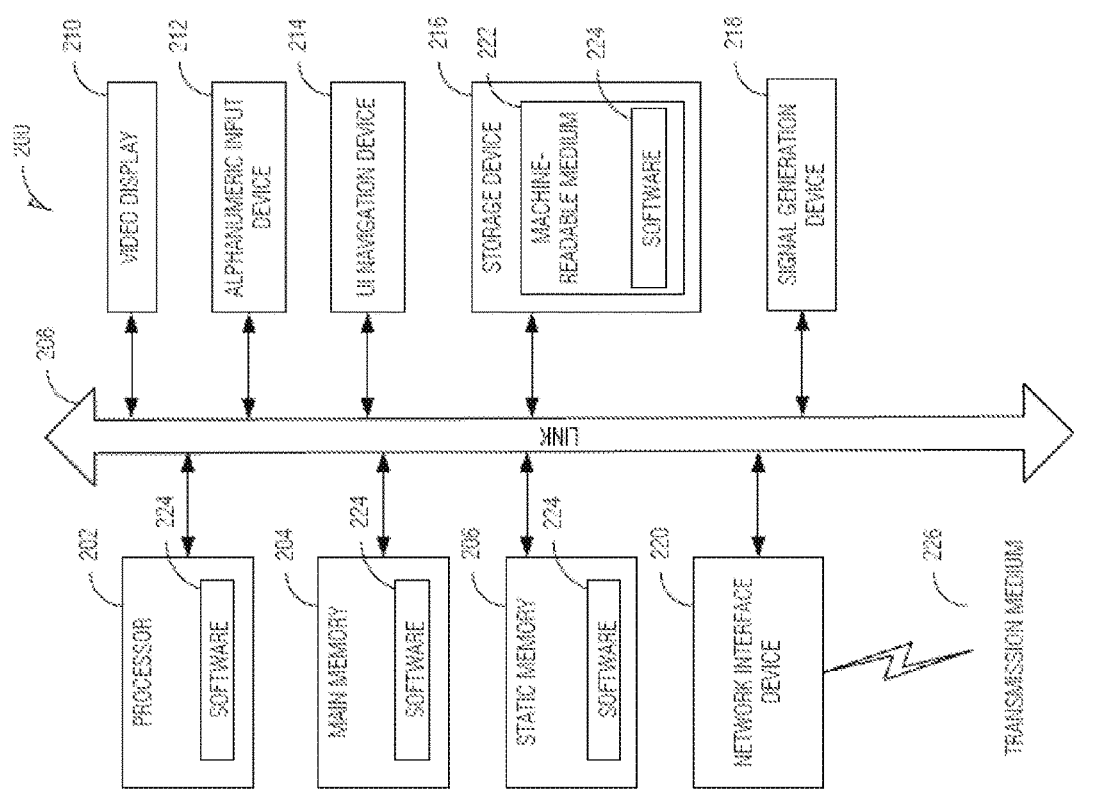
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), which may communicate with the core network via the eNB or gNB shown in FIG. 1. The IoT device may be an autonomous or semiautonomous device that performs one or more functions, such as sensing or control, among others, in communication with other IoT devices and a wider network, such as the Internet. The IoT device, in some embodiments may be limited in memory, size, or functionality, allowing larger numbers to be deployed for a similar cost to smaller numbers of larger devices. In other embodiments, however, the IoT device may be a smart phone, laptop, tablet, or PC, or other larger device. The IoT device may, in some embodiments, be a virtual device, such as an application on a smart phone or other computing device. IoT devices may include IoT gateways, used to couple IoT devices to other IoT devices and to cloud applications, for data storage, process control, and the like. IoT devices (or groups of IoT devices) may be accessible through remote computers, servers, and other systems, for example, to control systems or access data. A group or set of IoT devices that are connected to one another using wired and/or wireless technologies may be referred to as a "network of IoT devices," an "IoT network," or the like.

As above, networks of IoT devices may be used for a wide variety of applications in various deployment scenarios, including commercial and home automation, and smart applications, such as factories/manufacturing, cities, environment, agriculture, and health systems. For example, IoT networks may be used for water distribution systems, electric power distribution systems, pipeline control systems, plant control systems, light switches, thermostats, locks, cameras, alarms, motion sensors, and the like.

3GPP has standardized two designs to support IoT services—enhanced Machine Type Communication (eMTC) and NarrowBand IoT (NB-IoT). As UEs configured for multefire NB-IoT or eMTC operation, hereinafter referred to as eMTC UEs and NB-IoT UEs, continue to be deployed in increasing numbers, lowering the cost of eMTC UEs and NB-IoT UEs may be one enabler for implementation of IoT. Also, low power consumption may be one desirable to extend the life time of the battery. In addition, in some use cases of the eMTC UEs and NB-IoT UEs may be deployed deep inside buildings. In such cases, the eMTC UEs and NB-IoT UEs may employ coverage enhancement in comparison to the defined LTE cell coverage footprint.

As above, both Release (Rel)-13 eMTC and NB-IoT UEs may operate in licensed spectrum but may experience a decrease in data rate due to the scarcity of licensed spectrum in low frequency band. Thus, there are emerging interests in the operation of LTE systems in unlicensed spectrum. LTE operation in unlicensed spectrum includes Carrier Aggregation (CA) based on Licensed Assisted Access (LAA)/enhanced LAA (eLAA) systems, LTE operation in the unlicensed spectrum via dual connectivity (DC), and a standalone LTE system in the unlicensed spectrum, where LTE-based technology solely operates in unlicensed spectrum without use of an "anchor" in licensed spectrum, which is called the MulteFire system. To extend the benefits of LTE IoT designs into unlicensed spectrum, MulteFire 1.1 is expected to specify the design for Unlicensed-IoT (U-IoT).

The target band for narrowband unlicensed IoT is the sub-1 GHz band for the United States (US), European Union (EU), and China. However, the embodiments herein may be applicable to other frequency bands. Regulation defines the operation of such a system for either digital modulation or frequency hopping. Digital modulation may use a system bandwidth that is greater than 500 KHz with a power spectral density (PSD) limitation of 8 dBm/3 kHz. Frequency hopping instead may have limitations on the duty cycle, as well as the number of hops. In particular, the number of hops may be correlated to the maximum transmission power.

In the EU, for the above band, four new sub-channels have been proposed to be used. These sub-channels are: 865.6 MHz~865.8 MHz, 866.2 MHz~866.4 MHz, 866.8 MHz~867.0 MHz, 867.4 MHz~867.6 MHz. In the EU, the regulation regarding these sub-channels states that: 1) the maximum Equivalent Isotropically Radiated Power (EIRP) is 27 dBm; 2) adaptive power control is required; 3) the bandwidth is smaller than 200 kHz; 4) the duty cycle for network access points is smaller than 10%, while for other devices the duty cycle is 2.5%.

While operating a NB-IoT system in the unlicensed band as a digital modulation system is appealing, operating as a frequency hopping system may provide additional benefits: frequency diversity may be exploited by operating the system as frequency hopping system, while the initial access timing might be longer. In addition, digital modulation with 3 resource blocks (RBs) may have the same transmit (Tx) power as frequency hopping with 1 resource block, which translates in a loss in terms of coverage of about 5 dB.

Figure 3:
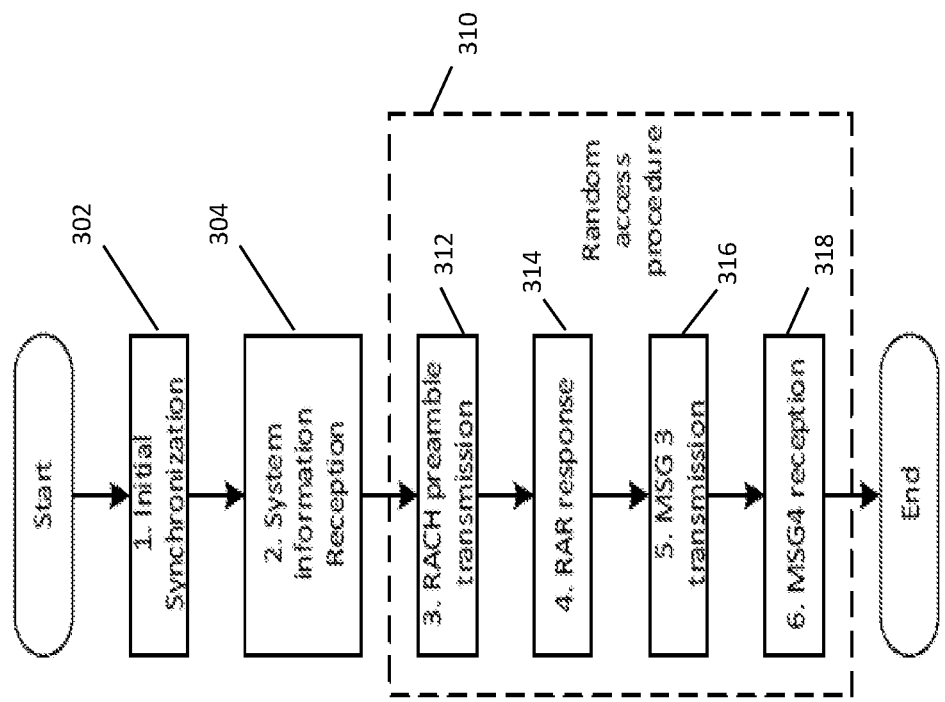
FIG. 3 illustrates an initial access procedure in accordance with some embodiments.

As above, the UE may perform an initial access procedure to connect with the radio access network (cell), which may be an eNB or gNB. FIG. 3 illustrates an initial access procedure in accordance with some embodiments. When UE starts the initial access, the UE may first perform an initial synchronization by detecting primary synchronization signals (PSS) and secondary synchronization signals (SSS) at operation 302 to obtain the cell identity and frame timing. The PSS may provide slot timing and Physical Layer ID; the SSS may provide the physical layer cell identity group number for Radio Frame Timing detection, Physical Layer Cell ID, cyclic prefix length, Frequency Domain Duplexing (FDD) or Time Domain Duplexing (TDD) determination.

The UE may then obtain the system information during reception of the Physical Broadcast Channel (PBCH) in the SSB, which may carry the master information block (MIB) and system information blocks (SIBs) of the cell at operation 304. The UE may obtain random access procedure configuration information from the PBCH. The PSS (1 symbol) and SSS (1 symbol) and PBCH (2 symbols) may be provided in a Synchronization Signal Block (SSB). One or more SSBs may be transmitted in an SSB burst that is itself transmitted within an SS Burst Set that contains one or more SSB bursts of 5 ms (default). The periodicity of the SS Burst Set may be 20 ms. The number of possible candidate SSB locations within SS Burst Set may be dependent on the frequency: 4 locations up to 3 GHz, 8 from 3 GHz to 6 GHz, and 64 from 6 GHz to 52.6 GHz.

After obtaining the random access procedure configuration information, the UE may perform a random access procedure at operation 310. The random access procedure may include the UE initially transmitting a Physical Random Access Channel (PRACH) (Msg-1) at operation 312 and attempting to receive a random access response (RAR) (Msg-2) in a physical downlink shared channel (PDSCH) at operation 314. The PRACH (xPRACH in NR and NPRACH when using narrowband) may carry a random access preamble from the UE towards the RAN. The PRACH may use the random access Radio Network Temporary Identifier (RA-RNTI) and a selected Preamble Index. The PRACH may be sent at the time and frequency location determined from the RACH parameters in SIB2.

In particular, the multefire NPRACH parameters may be sent in an information element NPRACH-ConfigSIB-NB-MF that specifies extended values for NPRACH-ConfigSIB-NB.

The NPRACH preamble transmission may start at the radio subframe fulfilling:

$$n_f \bmod (N_{period}^{NPRACH}/10) = 0 + N_{start}^{NPRACH} \cdot 30720 T_s.$$

Thus, the start the NPRACH preamble may be at a first valid uplink subframe (which may be 20 ms, 40 ms, 80 ms, 160 ms, 320 ms, 640 ms, 1280 ms, 2560 ms, or 5120 ms) after a start of the predetermined radio frame.

The preamble may be generated using Zadoff Chu (ZC) sequences. The preamble, if received by the RAN, may adjust uplink timing for message transmission by the UE, in addition to other parameters. The 5G NR random access preamble supports two different sequence lengths with various format configurations (Format 0, Format 1, Format 2, Format 3, Format A1, Format A2, Format A3, Format B1, Format B2, Format B3, Format B4, Format C0, Format C1).

| NPRACH-ConfigSIB-NB-MF information elements |
|---|

```
-- ASN1START
NPRACH-ConfigSIB-NB-MF-R1-1 ::=          SEQUENCE {
    nprach-ParametersList-R1-1               NPRACH-ParametersList-NB-MF-R1-1
}
NPRACH-ParametersList-NB-MF-R1-1 ::=     SEQUENCE (SIZE   (1.. maxNPRACH-Resources-
NB-r13)) OF NPRACH-Parameters-NB-MF-R1-1
NPRACH-Parameters-NB-MF-R1-1 ::=         SEQUENCE {
    nprach-Periodicity-R1-1                  ENUMERATED   {ms5120, ms10240}
    OPTIONAL,
    nprach-StartTime-R1-1                    ENUMERATED   {ms20, ms40, ms80, ms160,
ms320, ms640,
                                                          ms1280, ms2560, ms5120,
spare7, spare6,
                                                          spare5, spare4, spare3,
spare2, spare1},
    npdcch-StartSF-CSS-RA-R1-1               ENUMERATED   {v96, v128} OPTIONAL
}
-- ASN1STOP
```

| NPRACH-ConfigSIB-NB-MF field descriptions |
|---| npdcch-StartSF-CSS-RA
Starting subframe configuration for MF NPDCCH common search space (CSS), including RAR, Msg3 retransmission, and Msg4, see MFA TS 36.213 [23, Section 16.6].
If the field is present, it overrides npdcch-StartSF-CSS-RA signalled in NPRACH-ConfigSIB-NB.
nprach-ParametersList
Configures MF NPRACH parameters for each MF NPRACH resource. Up to three PRACH resources can be configured in a cell. Each MF NPRACH resource is associated with a different number of MF NPRACH repetitions.
nprach-Periodicity
Periodicity of a MF NPRACH resource, see MFA TS 36.211 [21, Section 10.1.6]. Unit in millisecond.
If the field is present, it overrides nprach-Periodicity signalled in NPRACH-ConfigSIB-NB.
nprach-StartTime
Start time of the MF NPRACH resource in one period, see MFA TS 36.211 [21, Section 10.1.6]. Unit in millisecond.
The field overrides nprach-StartTime signalled in NPRACH-ConfigSIB-NB.

As above, the NPRACH periodicity may be per the TDD configuration {ms80, ms160, ms320, ms640, ms1280, ms2560, ms 5120, ms 10240}. In other embodiments, the NPRACH periodicity may be the FDD configuration {ms40, ms80, ms160, ms240, ms320, ms640, ms1280, ms2560}.

NPRACH transmission can start $N_{start}^{NPRACH} \cdot 30720\ T_s$ ($T_s=0.032$ μs) time units after the start of a radio frame fulfilling $n_f \bmod (N_{Period}^{NPRACH}/10)=0$. For NB-IoT, after transmissions of 4·64 ($T_{CP}+T_{SEQ}$) time units, a gap of 40·30720 $T_s$ time units may be inserted. For MF NB-IoT, NPRACH transmission can start at the first uplink subframe which is $N_{start}^{NPRACH} \cdot 30720\ T_s$ time units after the start of a radio frame fulfilling $n_f \bmod (N_{period}^{NPRACH}/10)=0$.

An 839 long preamble sequence is used by four preamble formats (0-3) that are designed for large cell deployment in the sub-6 GHz range (FR1) and have a subcarrier spacing of 1.25 KHz or 5 KHz; a 139 short preamble sequence is used by nine preamble formats (A-C) that are designed for small cell deployment/beam sweeping in both the FR1 range with a 15 or 30 KHz subcarrier spacing and mmwave (FR2) range (i.e., above 6 GHz) with a 60 or 120 KHz subcarrier spacing. There may be 64 preambles defined in each time-frequency PRACH occasion.

If no RAR is received by the UE inside a predefined (or configured) time window, the UE may retransmit the PRACH with increasing power until the UE receives the RAR. If the UE receives the RAR, the UE may then transmit Msg-3 (RRC Connection Request) at operation 316 using the resources indicated by the RAR and may receive Msg-4 (Contention Resolution, carrying the acknowledgment (ACK)+Contention Resolution ID (CRID)) at operation 318, at which point the initial access procedure ends.

As above, when narrowband systems are used (NB-IoT), a NPRACH preamble may be transmitted by the NB-IoT UE in the NPRACH on multiple UL subframes. The NPRACH preamble may be based on symbol groups on a single subcarrier. There may be only two NPRACH preamble formats, each of which may be formed from two portions, a cyclic prefix (CP) and a sequence. The NPRACH preamble may be transmitted within a 180 kHz range formed from 48 subcarriers having a subcarrier spacing of 3.75 kHz. The NPRACH preamble may be repeatedly transmitted, with each repetition being transmitted on a different subcarrier (i.e., the NPRACH may hop to different subcarriers). The NPRACH may be constrained to be transmitted only at a specific timing within a predetermined NPRACH period. The NPRACH may be configured by SIB2 parameters that include, among others: periodicity, subcarrier offset (frequency location of the first subcarrier allocated to NPRACH), number of allocated subcarriers, number of NPRACH repetitions per attempt, starting time and fraction for calculating starting subcarrier index for the range of NPRACH subcarriers reserved for indication of UE support for multi-tone msg3 transmission.

A number of TDD DL/UL configurations may be used for communication between the UE and the RAN. In the FCC, the DL/UL may be selected from among configurations of: 10 DL+10 UL, 14 DL+6 UL, 4 DL+6 UL+4 DL+6 UL, 6 DL+14 UL, 8 DL+12 UL, 12 DL+8 UL, 6 DL+4 UL+6 DL+4 UL, or 18 DL+2 UL. In the EU, on the other hand, the DL/UL may be selected from among configurations of: 8 DL+72 UL, 4 DL+36 UL, 2 DL+18 UL.

To accommodate the DL/UL configurations, in some embodiments, a single subframe NPRACH can be introduced, adopting the NPRACH format 0. Using this format, the NPRACH may use a symbol group that contains one CP whose duration is 155.5 µs, and one symbol. The period of one symbol may be 266.7 µs. The cell size able to be supported by such a NPRACH is about 23.3 km. Each NPRACH preamble may contain four symbol groups, in total 2 ms. Of these four symbol groups, two symbol groups may be transmitted back-to-back and followed by a guard time of 155.6 µs, occupying 1 ms, i.e. $2*(155.5 \mu s + 266.7 \mu s) + 155.6 \mu s$. The other two symbol groups may be transmitted back-to-back and followed by a guard time, occupying 1 ms, as above.

In some embodiments, the frequency index of the first symbol group for the single subframe NPRACH may be configured by the eNB through high layer signaling. For the remaining symbol group, the eNB may reuse the TDD RACH subcarrier hopping rule of NPRACH format 0.

Alternatively, a single subframe NPRACH can be used having NPRACH format 0-a. In this format, each NPRACH preamble may have six symbol groups, in total 2 ms. Three symbol groups may be transmitted back-to-back and followed by a guard time, [3*(CP+symbol)+Gap] occupying 1 ms, where CP is 49.95 µs for a cell size of about 7.5 km. The remaining three symbol groups may be transmitted back-to-back and followed by a guard time, occupying 1ms.

In some embodiments, the frequency index of the first symbol group for the single subframe NPRACH may be configured by the eNB through high layer signaling. For the remaining symbol group, the eNB may reuse the TDD RACH subcarrier hopping rule of NPRACH format 0-a.

The above focused on transmission of one or more NPRACHs in a single subframe, in other embodiments, however, multiple subframes may be used to transmit the NPRACH. In particular, in some embodiments two contiguous subframes may be used to transmit the NPRACH. This may be supported using a TDD DL/UL configuration with 2 continuous UL subframes.

In some embodiments in which two continuous UL subframes are used to transmit the NPRACH, each NPRACH preamble may in some embodiments have four symbol groups in which two symbol groups may be transmitted back-to-back. In this case, each group may contain CP+2*symbol (each symbol being identical), where the CP and each symbol may be 266.7µ for which the coverage cell may be around 40 km. The NPRACH transmission may be $2*(266.7+266.7*2)+GP=2$ ms. Thus, the transmission may be continuous 2 ms+continuous 2 ms. The four symbol groups may be able to reuse the TDD RACH format 1 frequency hopping rule to determine the RB on which to transmit the NPRACH. FIG. 4A illustrates an example of a Physical Random Access Channel (NPRACH) preamble in accordance with some embodiments; FIG. 4B illustrates another example an NPRACH preamble in accordance with some embodiments.

Alternatively, in some embodiments in which continuous UL subframes are used to transmit the NPRACH, each NPRACH preamble may have six symbol groups in which three symbol groups may be transmitted back-to-back. In this case, each group may contain CP+2*symbol, where the CP may be 99.9 µs and each symbol may be 266.7 µs for a cell size of about 15 km, with the NPRACH transmission being $3*(99.9+266.7*2)+GP=2$ ms, continuous 2 ms+continuous 2 ms. The six symbol groups may be able to reuse the TDD RACH format 1-a frequency hopping rule to determine the RB on which to transmit the NPRACH.

In other embodiments, the number of symbol groups can be further increased by one group. A larger number of repetitions may then be used for better link quality.

In some embodiments, three continuous UL subframes used to transmit the NPRACH may be supported using a TDD DL/UL configuration with 4 continuous UL subframes. In some of such embodiments, each NPRACH preamble may have four symbol groups in which two symbol groups may be transmitted back-to-back. In this case, each group may contain CP+4*symbol, where the CP and each symbol may be 266.7 µs for a cell size of about 40 km, with the NPRACH transmission being $2*(266.7+266.7*4)+GP=3$ ms, continuous 3 ms+continuous 3 ms. The four symbol groups may be able to reuse the TDD RACH format 2 frequency hopping rule to determine the RB on which to transmit the NPRACH.

Alternatively, in some embodiments in which three continuous UL subframes are used to transmit the NPRACH, each NPRACH preamble may have six symbol groups in which three symbol groups may be transmitted back-to-back. In this case, each group may contain CP+3*symbol, where the CP may be 99.9 µs or 149.9 µs and each symbol may be 266.7 µs for a cell size of about 15 km or 22.3 km, with the NPRACH transmission being $3*(99.9$ [or 149.9 µs]$+266.7*3)+GP=3$ ms, continuous 3 ms+continuous 3 ms. The six symbol groups may be able to reuse the TDD RACH format 0-a or 1-a frequency hopping rule to determine the RB on which to transmit the NPRACH.

In some embodiments, four continuous UL subframes may be used to transmit the NPRACH. NPRACH transmission in this case may be supported using a TDD DL/UL configuration again with 4 continuous UL subframes.

In some of such embodiments, each NPRACH preamble may have six symbol groups in which three symbol groups may be transmitted back-to-back. In this case, each group may contain CP+4*symbol, where the CP may be 155.5 or 199.9 μs. The NPRACH transmission may be 3*(155.5 or 199.9 μs+266.7*4)+GP=8 ms, continuous 4 ms+continuous 4 ms. The three back-to-back symbol groups may be able to reuse the frequency hopping rule of the above three symbol group transmission.

FIG. 5A illustrates an example of back-to-back transmission of three symbol groups with a first index in accordance with some embodiments. As shown, the subcarrier spacing of the symbol group is 3.75 kHz. The subcarrier index may be an even number between 0 and 10, inclusive (i.e., 0, 2, 4, 6, 8, 10), with the first and third symbol groups (group 0 and 2) being transmitted on the same carrier while the second symbol group (group 1) being transmitted on an adjacent carrier at a higher frequency. FIG. 5B illustrates an example of back-to-back transmission of three symbol groups with a second index in accordance with some embodiments. In this embodiment, the subcarrier index may be an odd number between 1 and 1, inclusive (i.e., 1, 3, 5, 7, 9, 11), with the first and third symbol groups (group 0 and 2) being transmitted on the same carrier while the second symbol group (group 1) being transmitted on an adjacent carrier at a lower frequency.

Figures 6A, 6B:
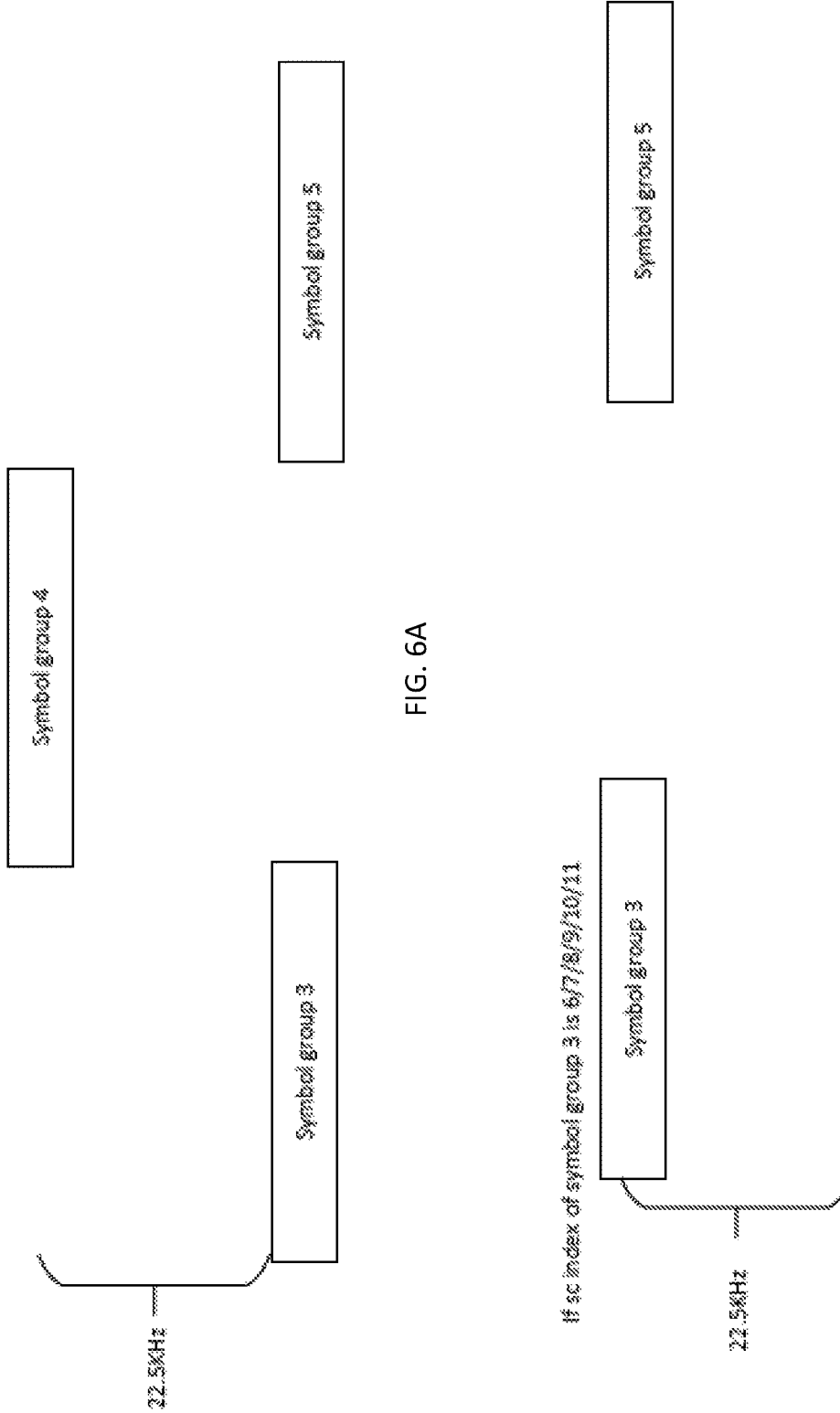
FIG. 6A illustrates an example of back-to-back transmission of three symbol groups with a third index in accordance with some embodiments.
FIG. 6B illustrates an example of back-to-back transmission of three symbol groups with a fourth index in accordance with some embodiments.

FIG. 6A illustrates an example of back-to-back transmission of three symbol groups with a third index in accordance with some embodiments; FIG. 6B illustrates an example of back-to-back transmission of three symbol groups with a fourth index in accordance with some embodiments. As shown, the subcarrier spacing of the symbol group is 22.5 kHz. The subcarrier index in FIG. 6A may be a number between 0 and 5, inclusive (i.e., 0, 1, 2, 3, 4, 5), with the first and third symbol groups (group 3 and 5) being transmitted on the same carrier while the second symbol group (group 4) being transmitted on a higher frequency separated by the subcarrier spacing. FIG. 6B illustrates an example of back-to-back transmission of three symbol groups with a second index in accordance with some embodiments. In this embodiment, the subcarrier index may be a number between 6 and 11, inclusive (i.e., 6, 7, 8, 9, 10, 11), with the first and third symbol groups (group 3 and 5) being transmitted on the same carrier while the second symbol group (group 4) being transmitted on a lower frequency separated by the subcarrier spacing.

In other embodiments, each NPRACH preamble may have four symbol groups in which four symbol groups may be transmitted back-to-back followed by a guard time. In this case, each group may contain one CP+3*symbol, where the CP may be 155.5 or 199.9 μs. The NPRACH transmission may be 4*(CP+3*symbol)+GP=4 ms. The four subframe NPRACH transmission may be able to reuse the two subframe NPRACH transmission format—i.e., Rel-15 TDD format 1 or Rel-15 TDD format 1-a.

For TDD format 1, four symbol groups that are transmitted back-to-back may occupy the continuous 4 subframes. A GT may follow at the end of the $4^{th}$ symbol group. These four symbol groups may reuse the four frequency hopping rule of Rel-15 TDD format 1. For TDD format 1-a, six symbol groups that are transmitted back-to-back may occupy the continuous 4 subframes. A GT may follow at the end of the $4^{th}$ symbol group. These four symbol groups reuse the four frequency hopping rule of Rel-15 TDD format 1-a.

In some embodiments, the frequency hopping rule of the 4 NPRACH symbol groups can reuse that of the 4 NPRACH symbol groups of FDD format 0/2.

In some embodiments, when four continuous UL subframes are used to transmit the NPRACH repetitions, each NPRACH preamble may have 4 NPRACH groups in total. In this case, two symbol groups may be transmitted back-to-back and followed by a guard time. Each group may contain one CP and 6 symbols such that 2*(CP+6*symbol)+Gap may occupy 4 ms, where CP is 266.7 μs. In some embodiments, the frequency hopping rule of the 4 NPRACH symbol groups can reuse that of the 4 NPRACH symbol groups of TDD format 0/1/2.

In some embodiments, six continuous UL subframes may be used to transmit the NPRACH repetitions. In this case, each NPRACH preamble may have 4 NPRACH groups in total, so that four symbol groups may be transmitted back-to-back and followed by a guard time. Each group may contain one CP and 4 symbols such that 4*(CP+4*symbol)+Gap may occupy 6 ms, where CP is 266.7 μs for a cell size of about 40 km. In some embodiments, the frequency hopping rule of the 4 NPRACH symbol groups can reuse the FDD format 0/1 or TDD format 0/1 frequency hopping rule.

In some embodiments in which six continuous UL subframes are used to transmit the NPRACH repetitions, each NPRACH preamble may have 4 NPRACH groups in total, so that four symbol groups may be transmitted back-to-back and followed by a guard time. Each group may contain one CP and 5 symbols such that 2*(CP+5*symbol)+Gap (or gap period GP) may occupy 6 ms, where CP is 99.9 μs, 133.2 μs or 266.7 μs for a cell size of about 15 km. In some embodiments, the frequency hopping rule of the 4 NPRACH symbol groups can reuse the FDD format 0/1 or TDD format 0/1 frequency hopping rule.

In some embodiments in which six continuous UL subframes are used to transmit the NPRACH repetitions, each NPRACH preamble may have six NPRACH groups in total, so that six symbol groups may be transmitted back-to-back and followed by a guard time. Each group may contain one CP and 3 symbols such that 6*(CP+3*symbol)+Gap may occupy 6 ms, where CP is 171.9 μs. The cell size may be about 25 km. In some embodiments, the frequency hopping rule of the six NPRACH symbol groups can reuse the TDD format 2 or TDD format 0/1 frequency hopping rule.

In some embodiments a three symbol NPRACH can be utilized to occupy 6 subframes. If the Rel-15 TDD format 2 is used for transmission of the NPRACH, the four symbol groups may be transmitted back-to-back and a guard time following the transmission. The four symbol groups may the TDD format 2 frequency hopping rule.

As above, the NPRACH preamble may contain multiple symbol groups transmitted without gaps in consecutive uplink subframes. When there are not enough consecutive uplink subframes to transmit a NPRACH preamble, the UE may postpone the preamble to next uplink opportunity with enough consecutive uplink subframes.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus of a user equipment (UE) configured for multefire narrowband Internet of things (NB-IoT) or enhanced Machine Type Communication (eMTC) operation, the apparatus comprising:
    processing circuitry configured to:
        decode, from an evolved NodeB (eNB), access information on a narrowband channel of an unlicensed band, the access information comprising a system information block (SIB);
        determine, based on the access information, whether a Time Domain Duplexing (TDD) uplink opportunity on the unlicensed band has a number of contiguous uplink subframes sufficient to support transmission of a narrowband Physical Random Access Channel (NPRACH) preamble; and
        encode the NPRACH preamble for transmission to the eNB in response to a determination that the TDD uplink opportunity has the number of contiguous uplink subframes sufficient to support transmission of the NPRACH preamble and otherwise wait for a subsequent or another TDD uplink opportunity that has the number of contiguous uplink subframes sufficient to support transmission of the NPRACH preamble, and a memory configured to store the NPRACH preamble.

2. The apparatus of claim 1,
wherein: the NPRACH preamble occupies two subframes, and the TDD uplink opportunity comprises at least two continuous uplink subframes.

3. The apparatus of claim 2,
wherein: the NPRACH preamble comprises four NPRACH symbol groups transmitted without gaps therebetween, and each NPRACH symbol group comprises a single cyclic prefix and two NPRACH symbols to which the cyclic prefix is appended.

4. The apparatus of claim 3,
wherein: the cyclic prefix is 266.7 μs.

5. The apparatus of claim 1,
wherein: the NPRACH preamble occupies six subframes, and the TDD uplink opportunity comprises at least six continuous uplink subframes.

6. The apparatus of claim 5,
wherein: the NPRACH preamble comprises four NPRNCH symbol groups transmitted without gaps therebetween, and each NPRACH symbol group comprises a single cyclic prefix and five NPRACH symbols to which the cyclic prefix is appended.

7. The apparatus of claim 6,
wherein: the cyclic prefix is 266.7 μs.

8. The apparatus of claim 1,
wherein the processing circuitry is further configured to:
    repeat the NPRACH preamble using a period of repetition selected from among: 80 ms, 160 ms, 320 ms, 640 ms, 1280 ms, 2560 ms, 5120 ms and 10240 ms.

9. The apparatus of claim 1,
wherein the processing circuitry is further configured to:
    start transmission of the NPRACH preamble at $N_{start}^{NPRACH} \cdot 0.30720\, T_s$ ($T_s$=0.032 ms) time units after a start of a radio frame fulfilling:

$$n_f \bmod(N_{period}^{NPRACH}/10)=0$$

10. The apparatus of claim 9,
wherein the processing circuitry is further configured to:
    start the transmission of the NPRACH preamble after the start of the radio frame at a time selected from among: 20 ms, 40 ms, 80 ms, 160 ms, 320 ms, 640 ms, 1280 ms, 2560 ms and 5120 ms.

11. The apparatus of claim 1,
wherein: the NPRACH preamble is started at $N_{start}^{NPRACH} \cdot 30720\, T_s$ ($T_s$=0.032 ms) time units after a start of a radio frame fulfilling: $n_f \bmod(N_{period}^{NPRACH}/10)=0$, at a time selected from among: 20 ms, 40 ms, 80 ms, 160 ms, 320 ms, 640 ms, 1280 ms, 2560 ms and 5120 ms.

12. An apparatus of an evolved NodeB (eNB), the apparatus comprising:
    processing circuitry configured to:
        encode, for transmission to a user equipment (UE) configured for multefire narrowband internet of things (NB-IoT) or enhanced Machine Type Communication (eMTC) operation, access information on a narrowband channel of an unlicensed band, the access information comprising a system information block (SIB); and
        decode a narrowband Physical Random Access Channel (NPRACH) preamble from the NB-IoT LIE in two or six contiguous uplink subframes indicated by the access information, the NPRACH preamble having a different number of NPRACH symbol groups dependent on whether the NPRACH preamble is received in two or six contiguous uplink subframes, and a memory configured to store the NPRACH preamble.

13. The apparatus of claim 12,
wherein: the NPRACH preamble occupies the two continuous subframes, the NPRACH preamble comprises four NPRACH symbol groups, and each NPRACH symbol group comprises a single cyclic prefix and two NPRACH symbols to which the cyclic prefix is appended.

14. The apparatus of claim 13,
wherein: the cyclic prefix is 266.7 μs.

15. The apparatus of claim 12,
wherein: the NPRACH preamble occupies the six continuous subframes, the NPRACH preamble comprises four NPRACH symbol groups, and each NPRACH symbol group comprises a single cyclic prefix and five NPRACH symbols to which the cyclic prefix is appended.

16. The apparatus of claim 15,
wherein: the cyclic prefix is 266.7 μs.

17. The apparatus of claim 12,
wherein: a repetition period of the NPRACH preamble is selected from among: 80 ms, 160 ms, 320 ms, 640 ms, 1280 ms, 2560 ms, 5120 ms and 10240 ms.

18. A non-transitory computer-readable storage medium that stores instructions for execution by one or more processors of a user equipment (UE) configured for multefire narrowband internet of things (NB-IoT) or enhanced Machine Type Communication (eMTC), the one or more processors to configure the UE to, when the instructions are executed:
decode, from an evolved NodeB (eNB), access information on a narrowband channel of an unlicensed band, the access information comprising a system information block (SIB); and
encode, for transmission to the eNB, a narrowband Physical Random Access Channel (NPRACH) preamble in two or six contiguous uplink subframes as indicated by the access information, the NPRACH preamble having a number of NPRACH symbol groups and a single cyclic prefix (CP) within each NPRACH symbol group each independent of whether the NPRACH preamble is to be transmitted in two or six contiguous uplink subframes; each NPRACH symbol group comprising a different number of NPRACH symbols dependent on whether the NPRACH preamble is to be transmitted in two or six contiguous uplink subframes, the NPRACH symbol groups transmitted without a gap therebetween.

19. The medium of claim 18,
wherein: the NPRACH preamble comprises four NPRACH symbol groups, if the NPRACH preamble occupies the two continuous subframes; each NPRACH symbol group comprises the cyclic prefix and two NPRACH symbols to which the cyclic prefix is appended, and if the NPRACH preamble occupies the six continuous subframes, each NPRACH symbol group comprises the cyclic prefix and five NPRACH symbols to which the cyclic prefix is appended.

20. The medium of claim 18,
wherein: a repetition period of the NPRACH preamble is selected from among: 80 ms, 160 ms, 320 ms, 640 ms, 1280 ms, 2560 ms, 5120 ms and 10240 ms, and the one or more processors to configure the UE to, when the instructions are executed, start the NPRACH preamble at $N_{start}^{NPRACH} \cdot 30720\ T_s$ ($T_s=0.032$ ms) time units after a start of a radio frame fulfilling: $n_f$ mod $(N_{period}^{NPRACH}/10)=0$, at a time selected from among: 20 ms, 40 ms, 80 ms, 160 ms, 320 ms, 640 ms, 1280 ms, 2560 ms and 5120 ms.

* * * * *